(12) United States Patent
Maruyama et al.

(10) Patent No.: US 6,344,510 B1
(45) Date of Patent: Feb. 5, 2002

(54) RUBBER VULCANIZATION AGENT AND RUBBER COMPOSITION CONTAINING THE SAME

(75) Inventors: Tsukasa Maruyama; Kazunori Ishikawa, both of Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/693,925

(22) Filed: Oct. 23, 2000

(51) Int. Cl.$^7$ .............................. C08G 75/04; C08K 5/36
(52) U.S. Cl. ...................... 524/392; 525/189; 525/535; 525/536; 528/374; 528/376
(58) Field of Search .................................. 525/535, 536, 525/189; 524/392; 528/374, 376

(56) References Cited

U.S. PATENT DOCUMENTS 2,235,621 A * 3/1941 Patrick .......................... 260/3

\* cited by examiner

*Primary Examiner*—Edward J. Cain
(74) *Attorney, Agent, or Firm*—Arent Fox Kintner Plotkin & Kahn, PLLC

(57) ABSTRACT

A rubber vulcanization agent comprising a polysulfide polymer having an average number of sulfur bonds in the repeating units of more than 2 but not more than 6 and having the formula (I)

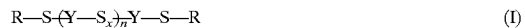

wherein Y indicates an alkylene group which may include a hetero atom, R is a residue obtained by reacting a thiol group with an unsaturated alicyclic compound, an unsaturated hydrocarbon compound having the structure (III) or (IV), which may include a hetero atom so as to cap the end thiol group, n is an integer of 1 to 100, and x is more than 2 but not more than 6.

5 Claims, No Drawings

RUBBER VULCANIZATION AGENT AND RUBBER COMPOSITION CONTAINING THE SAME

BACKGROUND OF THE INVENTION

1. Field of the Invention

The present invention relates to a rubber vulcanization agent and a rubber composition containing the same. More specifically, it relates to a rubber vulcanization agent capable of suppressing scorching at the time of processing, of improving the heat stability of the vulcanized rubber, and of facilitating production and a rubber composition containing the same.

2. Description of the Related Art

When the generally widely used sulfur is used as a vulcanization agent for a vulcanizable rubber, a polysulfide bond is mainly formed as the cross-linking structure between carbon chains of the rubber. A bond between sulfurs in polysulfide bonds is susceptible to heat and is easily cut, and therefore, a vulcanized rubber containing a large number of polysulfide cross-linking structures inevitably becomes inferior in the heat resistance. Therefore, as the cross-linking form of the vulcanized rubber, vulcanization agents and vulcanization accelerators for mainly forming monosulfide bonds and/or disulfide bonds have been actively studied. However, most of the vulcanization agents which have been reported to achieve the above object in the past have generated carcinogenic nitroso amines during vulcanization and, therefore, have been problematic in the safety. Further, while the resistance to heat aging of the vulcanized rubber has been improved to a certain extent by the use of the vulcanization accelerator, there has been the problems that the resistance to fatigue aging and resistance to cracking by bending is decreased.

As a rubber vulcanization agent for improving the heat stability of the vulcanized rubber without forming nitroso amines during the vulcanization, a polysulfide polymer containing a large amount of sulfur in the molecular chain has been reported (for example, see (1) Gomu Kogyo Binran (Rubber Industry Handbook, New Edition, p. 167, ed. by Society of Rubber Industry Japan Rubber (1973) and (2) Gosei Gomu Handbukku (Synthetic Rubber Handbook), p. 237, ed. by Shu Kanbara, Kyoichi Kawasaki, Magoichi Kitajima, and Masayuki Furuya (1960)). Further, since a polysulfide polymer is liquid, there is no worry of bloom after vulcanization unlike with vulcanization by sulfur, when used as a vulcanization agent (Japanese Unexamined Patent Publication (Kokai) No. 57-170939). However, a conventional polysulfide polymer is volatile and has a strong odor, and therefore, a vulcanized rubber using this as a vulcanization agent gives a strong odor and is not suitable for practical use (U.S. Pat. No. 2,235,621).

On the other hand, even among polysulfide polymers, since what has been developed as sealing materials have been nonvolatile substances with little odor, the use thereof as a vulcanization agent mixing well with rubber substances is possible. However, when the above liquid polysulfide polymer per se is used as a vulcanization agent, since the end group structure of the polymer is a thiol group, so-called "scorching" where the vulcanization proceeds early at the time of processing easily occurs. Further, since the average number of sulfur bonds in the repeating units is not more than 2, there have been the problems such that a long vulcanization time is required, for example. Thus, to prevent scorching during processing or shorten the vulcanization time, the technique has been adopted of capping the end thiol group in the polysulfide polymer, then increasing the number of sulfur bonds in the repeating units (Japanese Unexamined Patent Publication (Kokai) No. 10-120788). If a reaction with sulfur is caused to increase the number of sulfur bonds in the main chain, without capping the end thiol group in the thiol-terminated polysulfide polymer, the polymer is an unstable substance which generates hydrogen sulfide in the air and is changed to a highly sticky substance. Therefore, the increase in the number of sulfur bonds in a polysulfide polymer main chain should be carried out after capping the end thiol group. That is, the important process in producing a rubber vulcanization polysulfide polymer is the process for producing a polysulfide polymer by capping the end thiol group of a thiol group terminated polysulfide polymer.

The conventional methods of capping a thiol group of a thiol group terminated polysulfide polymer include the method of reacting a halogenated alkyl compound with a thiol group terminated polysulfide polymer and trapping the halogenated hydrogen produced by an amine compound and the method of capping the end with a halogenated alkyl simultaneously with forming the thiol group terminated polysulfide polymer. In both techniques, amine salts or sodium salts are formed as by-products and the complicated operations of filtering out these salt compounds and washing becomes necessary. Therefore, a polysulfide polymer having a capped end thiol group is capable of producing more simply had been sought.

Further, Japanese Unexamined Patent Publication (Kokai) No. 11-322931 discloses polysulfides having various substituents at the end group thereof. Among those, polysulfides having a benzothiazole group, a thiocarbamyl group, etc. which have vulcanization accelerating effects. In fact, these polar groups can accelerate the vulcanization speed, but the scorch time is shortened and therefore causes big problems in the viewpoint of a practical use thereof.

As mentioned above, the prior polysulfide polymers are produced so as to terminate the end thiol group which causes the scorch and also so as to shorten the vulcanization time. However, when the prior polysulfide polymers having the polar groups cannot provide practically sufficient unvulcanized rubber characteristics and also the properties of the vulcanized rubber are not sufficient.

SUMMARY OF THE INVENTION

Accordingly, the objects of the present invention are to maintain the sufficient unvulcanized characteristics (i.e., scorch and vulcanization time) and to easily provide a rubber vulcanization agent capable of improving the properties and the vulcanized rubber and the heat stability thereof.

In accordance with the present invention, there is provided a rubber vulcanization agent comprising a polysulfide polymer having the formula (I):

(I)

wherein Y indicates an alkylene group which may include a hetero atom, n is an integer of 1 to 100, x is more than 2 but not more than 6, and R is a residue obtained by reacting a polysulfide polymer having the formula (II):

(II)

wherein Y, n and x are as defined above
  with (i) an unsaturated alicyclic compound or (ii) a compound having the structure (III) or (IV)

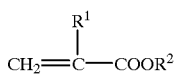

(III)

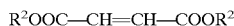

(IV)

wherein $R^1$ indicates a hydrogen atom or a methyl group and $R^2$ indicates a $C_1$ to $C_{18}$ hydrocarbon group having no polar groups, so as to cap the end thiol group.

In accordance with the present invention, there is also provided a rubber vulcanization agent having the average number of sulfur bonds of 3 to 5.

In accordance with the present invention, there is further provided a rubber vulcanization agent wherein $R^2$ in the formula (III) or (IV) indicates a $C_3$ to $C_8$ alkyl group.

In accordance with the present invention, there is further provided a rubber composition comprising 0.1 to 30 parts by weight of a rubber vulcanization agent, based upon 100 parts by weight of a diene rubber.

In accordance with the present invention, there is still further provided a rubber composition further comprising a sulfur at a weight ratio of the rubber vulcanization agent/the sulfur of at least 0.5, provided that the total amount of the rubber vulcanization and the sulfur is 0.5 to 20 parts by weight based upon 100 parts by weight of a diene rubber.

DESCRIPTION OF PREFERRED EMBODIMENTS

In this specification and in the claims which follow, reference will be made to a number of terms which shall be defined to have the following meanings:

The singular forms "a", "an" and "the" include plural referents unless the context clearly dictates otherwise. "Optional" or "optionally" means that the subsequently described event or circumstances may or may not occur, and that the description included instances where said event or circumstance occurs and instances where it does not. Throughout this application, where publications are referenced, the disclosures of these publications in their entireties are hereby incorporated by reference into this application in order to more fully describe the state of the art to which this invention pertains.

The present inventors engaged in intensive studies based on the above prior art and, as a result, found that, when an addition reaction between a polysulfide polymer having a thiol group at its end and (i) an unsaturated alicyclic compound, or (ii) a compound having the above structure (III) or (IV) is carried out so as to obtain a polysulfide polymer having a capped end thiol group, without forming byproducts, then adding sulfur in the main chain of the polymer, it is possible to produce a polysulfide polymer having the formula (I), as a rubber vulcanization agent by a simpler technique, whereby the present invention was completed. Further, we found that by blending 0.1 to 30 parts by weight of the rubber vulcanization agent, or a weight ratio of the rubber vulcanization agent/the sulfur of at least 0.5 and the total amount of the rubber vulcanization agent and the sulfur of 0.5–20 parts by weight, into 100 parts by weight of a diene rubber, the resistance to heat aging of the vulcanized rubber composition is extremely improved.

Further, the end functional groups the rubber vulcanization agent of the present invention can be freely selected from numerous types thereof. By suitably selecting the vulcanization agent, depending upon the type of the rubber, it is possible to improve the solubility or dispersability thereof in the rubber.

The polysulfide polymer having a thiol group at the end used as a material of the rubber vulcanization agent of the present invention can be exemplified by the formula (II):

(II)

wherein Y preferably indicates a $C_1$ to $C_{24}$ linear or branched alkylene group, which may contain a hetero atom such as oxygen, sulfur, or nitrogen. For example, as Y, methylene, ethylene, propylene, butylene, pentylene, hexylene, octylene, nonylene, decylene, undecylene, dodecylene, 1-methylethylene, 1-methylpropylene, 2-methylpropylene, 1,1-dimethylethylene, oxydiethylene, methylene-bis(oxyethylene), ethylene-bis(oxyethylene), thiodiethylene, N-methyl-N,N-diethylene, etc. In addition, the trivalent hydrocarbon groups such as 1,2,3-propantriyl group may be included, so far as the viscosity is not remarkably increased.

As specific examples of the polysulfide polymer having a thiol group at the end thereof, when Y is methylene-bis (oxyethylene), for example, the liquid polysulfide polymers made by Toray-Thiokol such as Thiokol LP-3 (average molecular weight of 1000) and Thiokol LP-55 (average molecular weight of 4000) may be mentioned.

A first polysulfide polymer having a capped end thiol group of the present invention can be produced by carrying out an addition reaction between a polysulfide polymer having a thiol group at the end thereof shown in the above formula (II) and an unsaturated alicyclic compound with or without the use of a solvent.

The unsaturated alicyclic compound used in the reaction is not particularly limited so long as it is an unsaturated alicyclic compound containing at least one double bond in the ring in the molecule, but cyclopentene, cyclohexene, cyclohexadiene, cycloheptene, cycloheptadiene, cycloheptatriene, cyclooctene, cyclooctadiene, cyclooctatriene, cyclooctatetraene, norbornene (bicyclo[2,2,1]hept-2-ene), norbornadiene (bicyclo[2,2,1]hept-2,5-diene), and their alkyl or alkenyl, or alkylidene substituents; polybicycloheptadienes such as dicyclopentadiene, tricyclopentadiene, and tetracyclopentadiene and their alkyl or alkenyl or alkylidene substituents, etc. may be exemplified. Among these, 5-ethylidene-2-norbornene(5-ethylidenebicyclo[2,2,1]hept-2-ene), 5-vinyl-2-norbornene (5-ethylidenebicyclo[2,2,1]hept-2-ene), 4-vinyl-1-cyclohexene, tetrahydroindene, and dicyclopentadiene are preferable, since they have in their molecules both a double bond selectively reacting with the end thiol group of the polysulfide and a double bond capable of forming a cross-linking structure with the rubber molecules at the time of vulcanization. In particular, dicyclopentadiene, norbornene, etc. is preferable in that it is used generally and broadly and can be inexpensively obtained.

The reaction between the thiol group terminated polysulfide polymer and unsaturated alicyclic compound may normally be performed by a suitable amount of reaction of the C—C double bonds in the unsaturated alicyclic compound with the thiol groups of the thiol group terminated polysulfide polymer, but is not limited to this stoichiometric equivalent. The ratio of the thiol group terminated polysulfide polymer and unsaturated alicyclic compound may be suitably determined. (e.g., 1:1.05–1.3)

The solvent usable in the reaction is not particularly limited so long as it uniformly dissolves the thiol group terminated polysulfide polymer and unsaturated alicyclic compound. Esters such as ethyl acetate, propyl acetate, and butyl acetate; ketones such as acetone, methylethylketone, and methylisobutylketone; ethers such as tetrahydrofuran, diethylene glycol dimethyl ether; aromatic hydrocarbons such as toluene and xylene; aliphatic hydrocarbons such as pentane, hexane, and cyclohexane; amide-based solvents such as dimethylacetamide and dimethylformamide; pyrrolidone-based solvents such as N-methylpyrrolidone and pyrrolidone; etc. may be mentioned. Preferably, dimethylacetamide, dimethylformamide, N-methylpyrrolidone, and mixed solvents of the same may be exemplified. The amount of the solvent used is 1 to 20 parts by weight, preferably 1 to 10 parts by weight, based upon 100 parts by weight of the thiol group terminated polysulfide polymer.

The reaction can be performed at, for example, 10 to 150° C., preferably 30 to 130° C., for, for example, 1 to 36 hours, preferably 3 to 20 hours. If the temperature is less than 10° C., the reaction tends to take a long time, while even if the reaction is performed at a temperature higher than 150° C., a commensurate effect of improvement of the reaction is not necessarily obtained and therefore, this is not wise economically.

A second polysulfide polymer having a capped end thiol group of the present invention can be produced by carrying out an addition reaction between a polysulfide polymer having a thiol group at the end as shown in the above formula (II) and an unsaturated hydrocarbon compound having the above formula (III) or (IV) in a solvent or without the use of a solvent and in the presence of a catalyst.

As the unsaturated hydrocarbon compound having an electron attracting group used in the reaction, (meth)acrylic acid; (meth)acrylic acid esters such as methyl(meth)acrylate, ethyl(meth)acrylate, ethyl(meth)acrylate, butyl(meth)acrylate, 2-ethylhexyl(meth)acrylate, octadecyl(meth)acrylate, and cyclohexyl(meth)acrylate, benzyl(meth)acrylate; diesters between dicarboxylic acids such as maleic acid, fumaric acid, and $C_1$ to $C_{18}$ linear or branched alcohols may be exemplified.

The reaction between the polysulfide polymer having the thiol group at the end thereof and unsaturated alicyclic compound may normally be carried out by a suitable amount of reaction of the C—C double bonds of the unsaturated hydrocarbon compound with the thiol groups of the thiol group terminated polysulfide polymer, but is not limited to this stoichiometric equivalent ratio. The ratio of the thiol group terminated polysulfide polymer and unsaturated hydrocarbon compound may be suitably determined (e.g., 1:1.05–1.3).

The solvent usable in the reaction is not particularly limited so long as it uniformly dissolves the thiol group terminated polysulfide polymer and unsaturated hydrocarbon compound. A solvent used, when reacting the above unsaturated alicyclic compound, can be mentioned. Further, the reaction may be performed in the absence of a solvent as well. The amount of the solvent used is 1 to 20 parts by weight, preferably 1 to 10 parts by weight, based upon 100 parts by weight of the thiol group terminated polysulfide polymer.

As the catalyst used, a tertiary amine compound, an alkali metal alkoxide such as sodium methoxide and sodium ethoxide, a quaternary ammonium chlorinated compound such as tetramethylammonium hydroxide and benzyl trimethyl ammonium hydroxide, etc. may be exemplified.

As the tertiary amine compound, monoamines, diamines, triamines, polyamines, cyclic amines, alcohol amines, ether amines, etc. may be mentioned. For example, trialkylamines such as triethylamine, tripropylamine, and tributylamine, N,N,N',N'-tetramethylethylenediamine, N,N,N',N'-tetramethylpropane-1,3-diamine, tetramethyl guanidine, N,N'-dimethylpiperadine, 1,8-diazabicyclo[5,4,0]-7-undecene (DBU), 1,4-diazadicyclo[2,2,2]octane (DABCO), bis(2-dimethylaminoethyl)ether, pyridine, etc. may be exemplified. These tertiary amine compounds may be used in any combinations thereof.

The amount of the catalyst used is, for example, 0.01 to 5 parts by weight, more preferably 0.05 to 1 part by weight, based upon 100 parts by weight of an end thiol group polysulfide polymer.

The reaction can be carried out at, for example, 10 to 130° C., preferably 30 to 110° C., for, for example, 1 to 36 hours, preferably 3 to 20 hours. If the temperature is less than 10° C., the reaction tends to take a long time, while even if the reaction is carried out at a temperature higher than 130° C., a commensurate effect of improvement of the reaction is not necessarily obtained so this is not wise economically.

By reacting sulfur with the polysulfide polymer with a capped end thiol group obtained above in, for example, the presence of an alkali catalyst, it is possible to obtain a rubber vulcanization agent comprised of a polysulfide polymer having an average number of sulfur bonds in the repeating units of 2 to 6.

The method of production of the polysulfide polymer may be a method similar to the method described in, for example, Japanese Unexamined Patent Publication (Kokai) No. 10-120788. The sulfur should be added to give an average number of sulfur bonds in the repeating units of the polysulfide polymer obtained of not more than 6. Addition to give an average number of sulfur bonds of not more 5 is further preferred. If the average number of sulfur bonds is more than 6, the heat stability of the vulcanized rubber falls and scorching easily occurs at the time of vulcanization, and therefore there is a detrimental effect on the scorch time. Therefore, this is not preferred.

The alkali catalyst used may be those illustrated in Japanese Unexamined Patent Publication (Kokai) No. 10-120788, but by using a catalyst such as the tertiary amine compound added when capping the end thiol group of the polysulfide polymer as is, it is possible to easily add sulfur to the polysulfide polymer by just adding only sulfur after the step of capping the end thiol group. The amount of the catalyst used is preferably 0.001 to 1 part by weight, more preferably 0.01 to 0.5 part by weight, based upon 100 parts by weight of polysulfide polymer having a capped end thiol group.

The rubber composition of the present invention contains the rubber vulcanization agent obtained above in an amount of 0.1 to 30 parts by weight, preferably 0.5 to 10 parts by weight, more preferably 1 to 6 parts by weight, based upon 100 parts by weight of the rubber. If less than 0.1 part by weight, a sufficient vulcanizing effect cannot be obtained, while if more than 30 parts by weight, further improvement cannot be obtained and, further, the scorching resistance and other aspects of workability are decreased.

As the diene rubber usable in the present invention, natural rubber and a diene synthetic rubber may be used. These may be used alone or may be used in any blend thereof. As the diene synthetic rubber, for example, polyisoprene rubber, polybutadiene rubber, styrene butadiene rubber, butyl rubber, chlorobutyl rubber, chloroprene rubber, etc. may be exemplified.

Further, it is possible to use sulfur together with the rubber vulcanization agent according to the present invention. The amounts thereof are such that a ratio of the above vulcanization agent/the sulfur is 0.5 or more and the total amount of the vulcanization agent and the sulfur is 0.5–20 parts by weight, based upon 100 parts by weight of rubber.

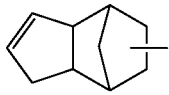—S—(C₂H₄•O•CH₂•O—C₂H₄—S₄)ₙ—C₂H₄O—CH₂—O—C₂H₄—S—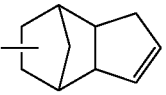

The rubber composition of the present invention may have suitably blended therein a vulcanization accelerator, filler (e.g., carbon black, silica), softener, plasticizer, anti-aging agent, etc. normally blended into rubber.

As the rubber vulcanization accelerator, a thiazole based vulcanization accelerator such as dibenzothiazyl disulfide, N-t-butyl-2-benzothiazolyl sulfenamide, N-cyclohexyl-2-benzothiazolyl sulfenamide; a thiuram based vulcanization accelerator such as tetramethylthiuram disulfide; dithiocarbamates, guanidines, thioureas, xanthogenates, etc. may be exemplified. The vulcanization accelerator is preferably used in an amount of 0.1 to 10 parts by weight, more preferably 0.1 to 5 parts by weight, based upon 100 parts by weight of the rubber.

The rubber composition of the present invention may be produced by mixing the above compounding agents by a known mixer or rubber kneading machine, for example, a roll, internal mixer, Banbury mixer, etc. Since the present rubber vulcanization agent is generally relatively high viscosity liquid, it is preferable to add a rubber composition after premixing with carbon black or silica at a weight ratio of, for example, 1:1, although the present rubber vulcanization agent can be added directly to a rubber composition by, for example, a roll.

EXAMPLES

The present invention will now be further illustrated by, but is by no means limited to, the following Examples.

Production of Vulcanization Agent 1

15 g of N,N-dimethylacetamide and 20.0 g of dicyclopentadiene as an unsaturated alicyclic compound were added to 300 g of a terminated polysulfide polymer having a thiol group at its end (Toray Thiokol LP-55, molecular weight 4000), then the mixture was stirred at 120° C. for 18 hours. After the end of the reaction, a yellow sticky substance of a polysulfide polymer with a capped end thiol group was obtained. The 1H-NMR spectrum of the obtained compound was measured. As a result, the proton peaks derived from the thiol group of the polysulfide polymer and the double bond in the bicycloheptene ring of the dicyclopentadiene disappeared, so the capping of the end thiol group was confirmed. Further, 110.6 g of sulfur powder and 0.9 g of triethylamine were added to the reaction solution and the mixture stirred at 90° C. for 16 hours. The sulfur powder disappeared along with the progress of the reaction. Next, the solvent and the triethylamine were removed in vacuo at 90° C. to obtain 430 g of a reddish brown sticky substance of a vulcanization agent 1 of the following formula:- wherein n is 23.

The viscosity at 25° C. was 1020 Pa·s.

Production of Vulcanization Agent 2

15 g of N,N-dimethylacetamide and 15.0 g of norbornene as an unsaturated alicyclic compound were added to 300 g of a terminated polysulfide polymer having a thiol group at its end (Toray Thiokol LP-55, molecular weight 4000), then the mixture was stirred at 120° C. for 18 hours. After the end of the reaction, a yellow sticky substance of a polysulfide polymer with a capped end thiol group was obtained. The 1H-NMR spectrum of the obtained compound was measured. As a result, the proton peaks derived from the thiol group of the polysulfide polymer and the double bond in the norbornene ring disappeared, so the capping of the end thiol group was confirmed. Further, 110.6 g of sulfur powder and 0.9 g of triethylamine were added to the reaction solution and the mixture stirred at 90° C. for 16 hours. The sulfur powder disappeared along with the progress of the reaction. Next, the solvent and the triethylamine were removed in vacuo at 90° C. to obtain 425 g of a reddish brown sticky substance of a vulcanization agent 2 of the following formula:

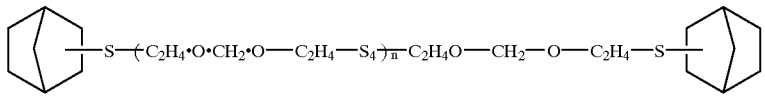

wherein n is 23.

The viscosity at 25° C. was 528 Pa·s.

Production of Vulcanization Agent 3

15 g of toluene, 19.3 g of n-butylacrylate as an unsaturated hydrocarbon compound, and 0.9 g of triethylamine were added to 300 g of a polysulfide polymer having a thiol group at its end (Toray Thiokol LP-55, molecular weight 4000), then the mixture was stirred at 100° C. for 14 hours. After the end of the reaction, a reddish brown sticky substance of a polysulfide polymer with a capped end thiol group was obtained. The 1H-NMR spectrum of the compound thus obtained was measured. As a result, the proton peaks derived from the thiol group of the polysulfide polymer and the vinyl group of n-butylacrylate disappeared, so the capping of the end thiol group was confirmed. Further, 110.6 g of sulfur powder was added to the reaction solution and the mixture stirred at 90° C. for 16 hours. The sulfur powder disappeared along with the progress of the reaction. Next, the solvent and the triethylamine were removed in vacuo at 90° C. to obtain 429 g of a reddish brown sticky substance of a vulcanization agent 3 of the following formula:

H₃C(CH₂)₃OOC—H₂C—H₂C—S—(C₂H₄.O.CH₂.O—C₂H₄
—S₄)ₙ—C₂H₄O—CH₂—O—C₂H₄—S—CH₂—CH₂—
COO(CH₂)₃CH₃ wherein n is 23. The viscosity at 25° C. was 168 Pa·s.

Production of vulcanization Agent 4

15 g of toluene, 21.7 g of dimethyl maleate as an unsaturated hydrocarbon compound, and 0.9 g of triethylamine were added to 300 g of a polysulfide polymer having a thiol group at its end (Toray Thiokol LP-55, molecular weight 4000), then the mixture was stirred at 100° C. for 7 hours. After the end of the reaction, a reddish brown sticky substance of a polysulfide polymer with a capped end thiol group was obtained. The 1H-NMR spectrum of the compound thus obtained was measured. As a result, the proton peaks derived from the thiol group of the polysulfide polymer and the C—C double bond of dimethyl maleate disappeared, so the capping of the end thiol group was confirmed. Further, 110.6 g of sulfur powder was added to the reaction solution and the mixture stirred at 90° C. for 16 hours. The sulfur powder disappeared along with the progress of the reaction. Next, the solvent and the triethylamine were removed in vacuo at 90° C. to obtain 428 g of a reddish brown sticky substance of a vulcanization agent 4 of the following formula:

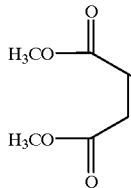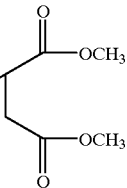

The viscosity at 25° C. was 417 Pa·s.

Production of Vulcanization Agent 5

15 g of toluene, 27.8 g of 2-ethylhexylacrylate as an unsaturated hydrocarbon compound, and 0.9 g of triethylamine were added to 300 g of a polysulfide polymer having a thiol group at its end (Toray Thiokol LP-55, molecular weight 4000), then the mixture was stirred at 100° C. for 14 hours. After the end of the reaction, a reddish brown sticky substance of a polysulfide polymer with a capped end thiol group was obtained. The 1H-NMR spectrum of the compound thus obtained was measured. As a result, the proton peaks derived from the thiol group of the polysulfide polymer and the vinyl group of 2-ethylhexyl disappeared, so the capping of the end thiol group was confirmed. Further, 110.6 g of sulfur powder was added to the reaction solution and the mixture stirred at 90° C. for 16 hours. The sulfur powder disappeared along with the progress of the reaction. Next, the solvent and the triethylamine were removed in vacuo at 90° C. to obtain 435 g of a reddish brown sticky substance of a vulcanization agent 5 of the following formula:

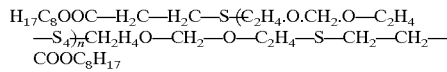

wherein n is 23. The viscosity at 25° C. was 303 Pa·s.

Production of Vulcanization Agent 6

As a comparative example, the compound of the following formula was produced by a method similar to the method described in Japanese Unexamined Patent Publication (Kokai) No. 10-120788.

15 g of toluene, 11.5 g of allylchloride, and 15.1 g of triethylamine were added to 300 g of a polysulfide polymer having a thiol group at its end (Toray Thiokol LP-55, molecular weight 4000), then the mixture was stirred at 100° C. for 14 hours. After the end of the reaction, the byproduct triethylamine hydrochloride was removed to obtain a reddish brown sticky substance of a polysulfide polymer with a capped end thiol group. The 1H-NMR spectrum of the obtained compound was measured. As a result, the disappearance of the peak derived from the thiol group of the polysulfide polymer and existence of the peak derived from the C—C double bond of an allyl group were confirmed, so the capping of the end thiol group was confirmed. Further, 110.6 g of sulfur powder was added to the reaction solution and the mixture stirred at 90° C. for 16 hours. The sulfur powder disappeared along with the progress of the reaction. Next, the solvent and the triethylamine were removed in vacuo at 90° C. to obtain 410 g of a reddish brown sticky substance of a vulcanization agent of the following formula:

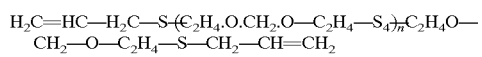

wherein n is 23.

The viscosity at 250C was 132 Pa·s.

Production of Vulcanization Agent 7

15 g of toluene, 17.5 g of 2-hydroxyethylacrylate as an unsaturated hydrocarbon compound, and 0.9 g of triethylamine were added to 300 g of a polysulfide polymer having a thiol group at its end (Toray Thiokol LP-55, molecular weight 4000), then the mixture was stirred at 100° C. for 14 hours. After the end of the reaction, a reddish brown sticky substance of a polysulfide polymer with a capped end thiol group was obtained. The 1H-NMR spectrum of the compound thus obtained was measured. As a result, the proton peaks derived from the thiol group of the polysulfide polymer and the vinyl group of 2-hydroxyethylacrylate disappeared, so the capping of the end thiol group was confirmed. Further, 110.6 g of sulfur powder was added to the reaction solution and the mixture stirred at 90° C. for 16 hours. The sulfur powder disappeared along with the progress of the reaction. Next, the solvent and the triethylamine were removed in vacuo at 90° C. to obtain 426 g of a reddish brown sticky substance of a vulcanization agent 7 of the following formula:

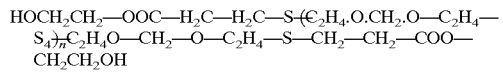

wherein n is 23. The viscosity at 25° C. was 523 Pa·s.

Examples 1 to 6

Standard Example and Comparative Examples 1 and 2

First, a master batch was produced by an ordinary method in the formulation shown in the following table:

Formulation of Master Batch

| | |
|---|---|
| Polyisoprene rubber | 100 parts by weight |
| Carbon black (N339) | 50 parts by weight |
| Zinc oxide | 3 parts by weight |
| Stearic acid | 1 part by weight |
| Antioxidant (N-phenyl-n'-(1,3-dimethylbutyl)-P-phenylenediamine) | 1 part by weight |

Antioxidant (N-phenyl-N'-(1,3-dimethylbutyl)-P-phenylenediamine) 1 part by weight The vulcanization agents 1 to 7 produced above, sulfur (5% oil extended powdered sulfur), and a vulcanization accelerator CZ (N-cyclohexyl-2-benzothiazolyl sulfenamide) were mixed in 155 parts by weight of the master batch in the formulations (parts by weight) shown in the following Table I, then the rubber was vulcanized under conditions of 148° C. and 30 minutes and tested as follows. The results are shown in Table I.

Scorch Time

The scorch time ML5UP (min) was determined at 125° C. based upon JIS K6300

Vulcanization Time (T95)

The time (min) at which 95% degree of vulcanization was determined at 148° C. based upon JIS K6300. The T95 value larger, the vulcanization rate slower.

Tensile Strength at Break (MPa) and 100% Modulus

The tensile strength at break after vulcanization and heat aging under conditions of 100° C.×96 hours was measured based on JIS K6251 and the retention rate (after aging/after vulcanization) was found.

Elongation at Break (%)

The breaking strength after vulcanization and heat aging under conditions of 100° C.×96 hours was measured based on JIS K6251 and the retention rate (after aging/after vulcanization) was found.

Abrasion Resistance

A lambourn abrasion tester (made by Iwamoto Seisakusho) was used for measurement under conditions of a load of 5 kg, a slip rate of 25%, a time of 4 minutes, and room temperature and the result indicated as an index. Note that the larger the value, the better the abrasion resistance shown.

TABLE I

| | Ex. 1 | Ex. 2 | Ex. 3 | Ex. 4 | Ex. 5 | Comp. Ex. 1 | Comp. Ex. 2 | Standard Example | Ex. 6 |
|---|---|---|---|---|---|---|---|---|---|
| Rubber Master batch | 155 | 155 | 155 | 155 | 155 | 155 | 155 | 155 | 155 |
| Vulcanization agent 1 | 5 | — | — | — | — | — | — | — | — |
| Vulcanization agent 2 | — | 5 | — | — | — | — | — | — | 2.5 |
| Vulcanization agent 3 | — | — | 5 | — | — | — | — | — | — |
| Vulcanization agent 4 | — | — | — | 5 | — | — | — | — | — |
| Vulcanization agent 5 | — | — | — | — | 5 | — | — | — | — |
| Vulcanization agent 6 | — | — | — | — | — | 5 | — | — | — |
| Vulcanization agent 7 | — | — | — | — | — | — | 5 | — | — |
| Sulfur | — | — | — | — | — | — | — | 1.8 | 0.9 |
| Vulcanization accelerator CZ | 1 | 1 | 1 | 1 | 1 | 1 | 1 | 1 | 1 |
| Unvulcanized properties | | | | | | | | | |
| Scorch time ML5UP (min) | 14.6 | 14.5 | 14.1 | 14.3 | 14.6 | 13.9 | 14.1 | 14 | 14.2 |
| Vulcanization time (T95) | 14.1 | 14.5 | 14.1 | 14.7 | 13.8 | 13.6 | 37.5 | 10.2 | 12.9 |
| Physical properties after vulcanization | | | | | | | | | |
| TB (MPa) | 29.1 | 29 | 29.3 | 28.9 | 29.5 | 28.8 | 29.3 | 29 | 29.1 |
| EB (%) | 525 | 538 | 543 | 526 | 534 | 531 | 521 | 525 | 532 |
| 100% Modulus | 2.9 | 3.3 | 2.9 | 3.1 | 3.2 | 3 | 2.9 | 3.1 | 3.2 |
| Physical properties after aging | | | | | | | | | |
| TB (MPa) | 23.1 | 23.5 | 24.3 | 22.9 | 23.6 | 20.8 | 23.5 | 15 | 21.8 |
| EB (%) | 373 | 392 | 388 | 396 | 364 | 322 | 331 | 260 | 311 |
| 100% Modulus | 4.1 | 3.8 | 3.9 | 4 | 3.9 | 4.1 | 4.1 | 4.5 | 4.4 |
| TB retention rate | 79.4 | 81 | 82.9 | 79.2 | 80 | 72.2 | 80.2 | 51.7 | 75 |
| EB retention rate | 71 | 72.9 | 71.5 | 75.3 | 68.2 | 60.6 | 63.5 | 49.5 | 58.5 |
| 100% Modulus retention rate | 141 | 127 | 135 | 129 | 122 | 137 | 141 | 145 | 137 |
| Abrasion resistance | 115 | 113 | 109 | 115 | 119 | 102 | 91 | 100 | 110 |

As shown in Table I, it was confirmed that compared with the rubber composition of Standard Example which was vulcanized by sulfur without use of the vulcanization agent of the present invention, the rubber compositions of Examples 1 to 6 of the present invention and Comparative Example 1 and 2, which was vulcanized with the vulcanization agent having the polysulfide structure, exhibited a high/heat aging resistance (i.e. good retention rate for the tensile strength at break (TB), elongation at break (EB) and 100% modulus). Comparative Example 1 is not preferable from the industrial viewpoints, because TB, EB and 100% Modulus retention rates are not sufficient although the unvulcanized properties are not bad. As shown in Comparative Example 2, when a polar group such as a hydroxyl group is present in the end of the vulcanization agent, there are problems in the unvulcanized properties such as the occurrence of the delay in the vulcanization. Further, it was confirmed that the rubber compositions of Examples 1 to 6 were improved in abrasion resistance that the rubber vulcanization agent of the present invention had a high dispersability with respect to rubber molecules.

In accordance with the present invention, it is possible to easily and conveniently produce a rubber vulcanization agent comprised of a polysulfide polymer with an average number of bonds of sulfur in the repeating units made 2 to 6 by causing a reaction between a polysulfide polymer having a thiol group at an end and an unsaturated alicyclic compound, unsaturated hydrocarbon compound having an ester group so as to cap the end thiol group, then adding sulfur in the main chain of the polysulfide polymer. Further, it is possible to suppress scorching at the time of vulcanization and improve the heat stability of the vulcanized rubber by blending the rubber vulcanization agent of the present invention in a rubber composition.

What is claimed:

1. A rubber vulcanization agent comprising a polysulfide polymer having the formula (I):

 (I)

wherein Y indicates an alkylene group which may include a hetero atom, n is an integer of 1 to 100, x is more than 2 but not more than 6, and R is a residue obtained by reacting a polysulfide polymer having the formula (II):

 (II)

wherein Y, n and x are as defined above with (i) an unsaturated alicyclic compound or (ii) a compound having the structure (III) or (IV)

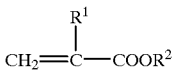 (III)

 (IV)

wherein $R^1$ indicates a hydrogen atom or a methyl group and $R^2$ indicates a $C_1$ to $C_{18}$ hydrocarbon group having no polar groups, so as to cap the end thiol group.

2. A rubber vulcanization agent as claimed in claim 1, wherein the average number of sulfur bonds is 3 to 5.

3. A rubber vulcanization agent as claimed in claim 1, wherein $R^2$ in the formula (III) or (IV) indicates a $C_3$ to $C_8$ alkyl group.

4. A rubber composition comprising 0.1 to 30 parts by weight of, based upon 100 parts by weight of a diene rubber, a rubber vulcanization agent according to claim 1.

5. A rubber composition as claimed in claim 4, further comprising a sulfur at a weight ratio of the rubber vulcanization agent/the sulfur of at least 0.5, provided that the total amount of the rubber vulcanization agent and the sulfur is 0.5 to 20 parts by weight, based upon 100 parts by weight of a diene rubber.

* * * * *